United States Patent [19]

Hachiya et al.

[11] Patent Number: 4,572,835
[45] Date of Patent: Feb. 25, 1986

[54] METHOD FOR MANUFACTURING DEAERATED CHOCOLATE PRODUCTS

[75] Inventors: Iwao Hachiya; Norio Joyama, both of Kanagawa, Japan

[73] Assignee: Meiji Seika Kaisha Ltd., Tokyo, Japan

[21] Appl. No.: 622,825

[22] Filed: Jun. 21, 1984

[30] Foreign Application Priority Data

Jun. 23, 1983 [JP] Japan ................. 58-111877

[51] Int. Cl.$^4$ ............................................. A23G 1/00
[52] U.S. Cl. ................................... 426/306; 426/487; 426/512; 426/520; 426/660
[58] Field of Search ............... 426/660, 487, 512, 515, 426/306, 520

[56] References Cited

U.S. PATENT DOCUMENTS

| | | | |
|---|---|---|---|
| 2,147,184 | 2/1939 | Aasted | 426/487 X |
| 3,904,777 | 9/1975 | Goerling | 426/660 X |
| 4,032,667 | 6/1977 | Kreuter | 426/660 |
| 4,156,743 | 5/1979 | Schmitt | 426/660 X |
| 4,440,797 | 4/1984 | Berkes et al. | 426/487 X |

FOREIGN PATENT DOCUMENTS

| | | | |
|---|---|---|---|
| 0072866 | 6/1978 | Japan | 426/660 |
| 513565 | 1/1938 | United Kingdom | 426/660 |
| 0527181 | 9/1976 | U.S.S.R. | 426/660 |

*Primary Examiner*—R. B. Penland
*Attorney, Agent, or Firm*—Sughrue, Mion, Zinn, Macpeak & Seas

[57] ABSTRACT

A method for manufacturing a deaerated fatty confectionaries, specifically, chocolate blocks, chocolate blocks with a confectionary center, chocolate covered products, white chocolate or colored chocolate blocks, and the like, having a substantially reduced air content without requiring excessive shaking. In accordance with the invention, the fatty confectionary mass in a fluidal state and flowing in the form of a film is subjected to a reduced pressure, preferably, within a range of 10 to 350 Torr. Tempering can be carried out either prior to, during, or subsequent to the deaerating treatment. The deaerated mass can then be used for manufacturing chocolate products by molding, shell-molding, or covering.

13 Claims, 5 Drawing Figures

METHOD FOR MANUFACTURING DEAERATED CHOCOLATE PRODUCTS

BACKGROUND OF THE INVENTION

The present invention relates to a method for manufacturing fatty confectionaries such as chocolates, white chocolates or the like which contain substantially no air therein and which have an excellent color, gloss and flavor.

Fatty confectionaries formed of chocolate mass used for chocolate blocks, chocolate-covered candies or cookies and the like and chocolate-like mass used for white chocolates, colored chocolates and the like have been susceptible to the admission of air therein when the latter is stirred in a chocolate reservoir associated with a blender, storage tank, tempering machine, depositor, or enrober or other coating apparatus in chocolate processing and molding steps, and a portion of this air is formed into bubbles distributed in the mass.

For forming fatty confectionaries such as chocolate blocks and the like with the use of molds, the chocolate or chocolate-like mass is filled into the mold by a filling apparatus such as a depositor or the like and then subjected to shaking or tapping. This causes a portion of the air bubbles contained therein to float on the top surface (bottom surface of the finished product) of the fatty mass or the area adjacent the top surface. The bubbles are then burst and scattered from the mass, thereby achieving partial deaerating. However, many fine bubbles are still left, dispersed in the mass, when the mass is cooled and solidified. The larger residual bubbles have a diameter of typically 20 to 50 microns, while the smaller residual bubbles have a diameter of typically 2 to 10 microns. The chocolate blocks and the like during molding are solidified with the bottom surface thereof having many bubble venting traces due to the removal of the bubbles during cooling and solidification. Hence, the products tend to have a rough surface due to the residual bubbles and bubble venting traces at the bottom surface and the area adjacent thereto.

For forming fatty confectionaries such as chocolate blocks with a confectionary center, the fatty mass is filled into the mold in the manner as aforementioned, and, upon reversing the mold, the mass is subjected to oscillation or vibration and scraping so as to remove the excess mass. The fatty mass left in the inner surface of the mold is then cooled and solidified to form the shell of the mass. The shell is then filled with a solid center material or with a liquid confectionary center after reversing the mold, after which the fatty mass is again filled into the mold and spread over the center with a scraper, then cooled and solidified. This operation is the so-called "shell molding" used for manufacturing fatty confectionaries with centers.

Disadvantages derived from shell molding are that the bottom surface of the fatty confectionary is rough, as above discussed, causing it to remarkably lose its gloss. Another disadvantage is that bubbles are dispersed and held adjacent the bottom surface of the fatty confectionary, resulting in a whitish color and lowering the gloss of the product. A further disadvantage is that the fine bubbles held in the interior of the fatty confectionary, if large in number, lower the hardness of the product, destroying the "snap" of the product, and bring out a heavy masticability and taste.

One prior art approach to removing the residual bubbles from fatty confectionaries such as chocolates and the like is to increase the amount of cacao butter in the composition to reduce the viscosity of the mass to allow the bubbles to more readily float to the surface of the mass and to readily burst. If necessary, an additional means is provided to more strongly shake or tap the mold, and more time can be spent shaking or tapping the mold. However, cacao butter is a very expensive material. Also, increasing the amount of cacao butter requires that the proportion of materials such as cacao mass, dried milk, sugar and the like be reduced, which adversely affects the taste of the product.

Stronger or longer shaking or tapping applied to the mold readily wears and damages the mold and produces much noise, thereby lowering the working conditions. With regard to quality, the viscosity of the chocolate mass in the mold is reduced by the shaking or tapping, which causes the fatty confectionary mass to reach above the desired height on the inner wall surfaces of the mold. Thus, the fatty confectionary mass demolded from the mold after cooling and solidifying is so shaped that a portion adjacent its side edges in contact with the side wall surface of the mold is thick and the center of the bottom is thin and has a concave bottom with variations therein. Still further, it is difficult to mold chocolate blocks in thin sheet form such as for so-called leaf chocolates or the like with a thickness of about 2 to 3 mm, thereby involving marked bottom defects in appearance. Increasing the time of shaking or tapping is effective for debubbling if the viscosity of the fatty confectionary mass is low, that is, less than about 20,000 cps, but is not effective if the viscosity is high, that is, more than about 25,000 to 30,000 cps. In addition, it is required that the molding speed be reduced or a longer shaking or tapping stroke be employed. In any event, disadvantages are involved in the attendant increase in the manufacturing cost.

SUMMARY OF THE INVENTION

The present inventors have conducted research into deaerating a fatty confectionary mass to eliminate the various defects noted above and have noted the following effects. First, the fatty confectionary mass in the fluid state can be deaerated by holding it at a reduced pressure prior to molding without shaking or tapping and while regulating the temperature of the mass. The fatty confectionary mass can be tempered either prior to or during the deaerating treatment. Alternatively, the fatty confectionary mass can be tempered after the deaerating treatment and, if desired, cooling. The deaerated mass thus prepared is employed for ordinary moldings such as chocolate blocks molding, shell molding, and coating. In this instance, the fatty confectionary mass essentially requires no change in the composition, that is, in the proportion of the various ingredients so that a confectionary having a high density and an excellent color, gloss, "snap", masticability and taste, containing few bubbles, and having a viscosity of more than about 25,000 to 30,000 cps can be efficiently and economically manufactured.

Accordingly, the invention provides a method for manufacturing a deaerated fatty confectionary characterized in that a fluid fatty confectionary mass in the form of a film is held at a reduced pressure to subject it to a deaerated treatment for removing air from the mass. The deaerated fatty confectionary mass is then subjected to molding, shell molding, and covering in the conventional manner.

The fatty confectionary products obtained with the use of the method according to the invention can be used for manufacturing popular chocolate products such as various chocolate coated candies or cookies and the like, and for manufacturing products similar to chocolate-like confectionaries such as a white chocolates, colored chocolates and the like.

In the method of the invention, preferably the fatty confectionary mass has a viscosity less than about 90,000 cps, and is maintained at a reduced pressure within the range of from 10 to 350 Torr. When the fatty confectionary mass is deaerated in this manner until the quantity of bubbles reaches 0.7% by volume, a chocolate confectionary product is obtained which has an excellent color, gloss, "snap", masticability and taste compared with a product produced using a conventional method and which contains air in an amount of more than 0.7% by volume.

In accordance with the method of the invention, the deaerating treatment is carried out when the mass is held in the form of a film in the fluid state and with a reduced pressure of less than 350 Torr. If the deaerating treatment is, however, carried out with the mass held in a batch, the batch should be stirred for good results.

The deaerating method of the invention can be carried out in a continuous manner by holding the fatty confectionary mass at a reduced pressure in a deaerating treatment container having the form of a vertical cylinder having an inner wall surface divided into zones of different temperature. The container is provided at its top with an inlet for the air-containing mass and at its bottom with an outlet for the deaerated mass. The fatty confectionary mass flows as a film along the inner wall surface of the container while the mass is stirred by a scraping rotary blade disposed in the container.

According to the method of the invention, the fatty confectionary mass may be subjected to a tempering prior to the deaerating treatment, during the deaerating treatment, or subsequent to the deaerating treatment.

When deaerating is carried out by the use of the container of the vertical cylinder type, the container is provided on its outer wall surface with a plurality of jackets for providing the zones of different temperatures on the inner wall surface of the container.

In accordance with the method of the invention, the fluidal fatty confectionary mass is treated in such a manner that the interior of the deaerating container is maintained at a reduced pressure while the mass flows in film form along the inner wall surface of the deaerating container. Alternatively, the fluidal fatty confectionary mass can be preheated in a known manner and then passed through the deaerating container in the manner described. The preheating of the mass prevents it from cooling to the point where it solidifies due to heat conduction to the jackets. Otherwise, the temperature of the jackets should be set so as to prevent solidification.

DESCRIPTION OF THE PREFERRED EMBODIMENTS

The method of the invention may be suitably carried out with the use of the apparatuses diagrammatically shown in FIGS. 1, 2, 3 and 5.

Figure 1:
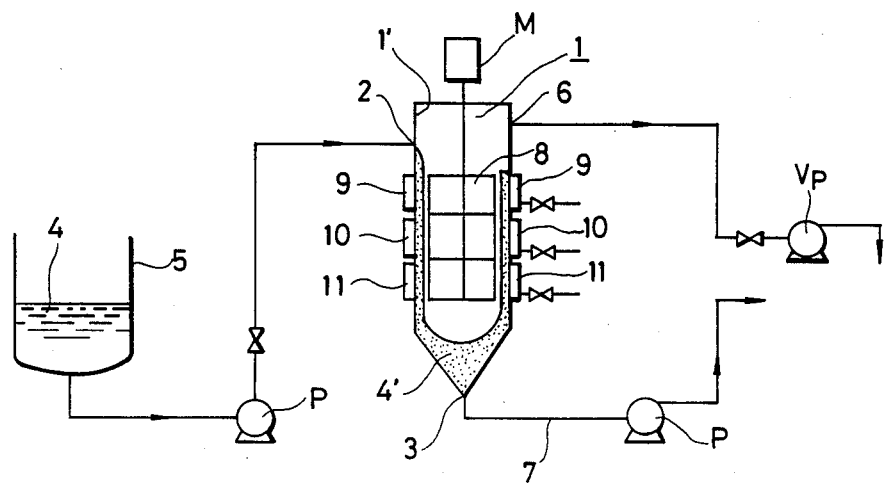
FIG. 1 is an illustrative view of a deaerating device used in the deaerating method of the present invention.

The apparatus diagrammatically shown in FIGS. 1 and 2 will now be described. Referring first to FIG. 1, a deaerating container 1 has the form of a vertical cylinder in which a deaerating treatment is carried out. The container 1 is hermetically sealed, and its interior is at a pressure less than atmospheric pressure, preferably, within a range of 10 to 350 Torr. The container 1 is provided at its top with an inlet 2 for receiving the fluidal confectionary mixture to be debubbled, and at its bottom with an outlet 3 for the deaerated mass. The inlet 2 communicates through a conduit, a switching valve, and a pump P for feeding the mixture to the container 1, and with a storage tank 5 for holding a pool of the mass 4 therein. The outer periphery of the storage tank 5 is surrounded by a heating jacket (not shown). The container 1 is formed with an exhaust port 6 which is connected with an exhaust pipe, a switching valve and a vacuum pump VP. The interior of the container 1 is held in a reduced pressure condition by operation of the vacuum pump VP. The fluidal mass fed from the inlet 2, which is in the form of a film, flows down along an inner wall surface 1' of the container 1 during which time it is subjected to a deaerating treatment. The mass is thereafter accumulated in a pool 4' at the bottom of the container.

Inside the container 1 are provided plural scraping rotary blades 8, which are made to rotate by a rotary motor M connected thereto. The outer edges of the rotating blades 8 scrape a thin layer of the mass from the container walls. This spreads the mass over the entire circumference of the inner wall surface 1' and allows it to flow down in the form of a film while stirring. The deaerated mass from the pool 4' passes through the outlet 3 and through a line 7 to a pump P for discharge.

The container 1 has temperature regulating jackets 9, 10 and 11 on its outer wall at locations corresponding to the portions of the inner wall surface where the confectionary mass flows. Each of the jackets is adapted to pass warm or cool water therethrough for temperature control as required.

Figure 2:
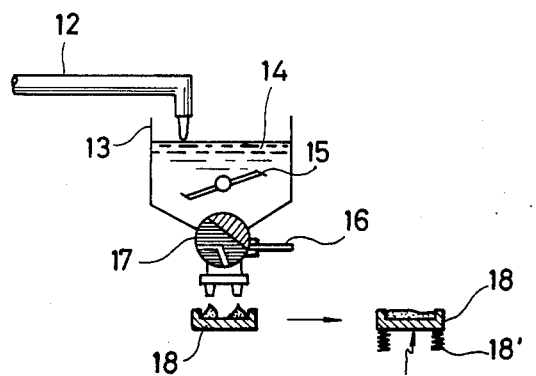
FIG. 2 is a longitudinal cross-sectional view of a conventional molding apparatus for a tempered and deaerated chocolate mass.

From the pump 7, the deaerated mass passes through a supply pipe 12 to a molding device, as shown in FIG. 2, where it is molded into, for instance, a chocolate block. The mass from the supply pipe 12 in the fluidal state initially enters a chocolate storage tank 13 of the molding device and is there accumulated in a pool 14. The storage tank 13 has an outer wall surrounded by further temperature control jackets (not shown). The chocolate mass 14 is stirred by a stirrer blade 15 so that a row of deposits of correct weight of the mass is delivered through a rotary multiple valve 17, which is disposed at the bottom of the storage tank 13 and which is provided with a piston 16, intermittently filled into molds 18. The molds 18 into which the confectionary mass is filled are conveyed to a shaking unit 18'. The confectionary mass in the molds is thus subjected to shaking to fully spread it over the molds.

The practice of the invention with the apparatus illustrated in FIGS. 1 and 2 will now be described in detail.

As shown in FIG. 1, the chocolate mass pool 4, accumulated in the storage tank 5 after being subjected to heating, is supplied from the inlet 2 at a measured rate to the deaerating container 1 via the pump P and the switching valve. The interior of the container 1 is maintained at a reduced pressure of the order of from 10 to 350 Torr by the vacuum pump VP. The chocolate mass 4 supplied to the interior of the container 1 flows down along the inner wall surface 1' and is spread in the form of a film over the entire inner wall surface 1' of the container 1 by the scraping rotary blades 8, which are rotated at a circumferential speed of from 20 to 150 mm/min. The mass flows down toward the outlet 3. Cooling water is passed through the jackets 9 and 10 surrounding the deaerating container to chill the chocolate mass to a temperature of the order of 24° to 26° C. to form crystals of cacao butter.

Next, warming water is circulated through the jacket 11 surrounding the lower portion of the deaerating container 1 to reheat the chocolate mixture 4 to a temperature of the order of 28° to 30° C. This leaves only stable $\beta$-type crystal seeds of cacao butter.

The extent of deaerating the chocolate mass 4 and the capacity for treating the same (amount thereof treated) are mainly determined by the viscosity of the chocolate mass 4, the pressure in the container 1, the stirring speed of the mass, and the like. In general, the lower the viscosity of the mass, the lower can be the pressure in the container 1, the faster can be the stirring speed of the mass, the better the mass is deaerated.

As described hereinbefore, in order to obtain chocolate having an air content of the order of less than 0.7% in terms of volume, the circumferential stirring speed should be about 40 m/min. For example, if the chocolate mass has a viscosity of the order of 10,000 to 15,000 cps, even a reduced pressure of 260 to 310 Torr may be applied without significantly increasing the air content. On the other hand, if the chocolate mass has a higher viscosity of the order of 80,000 to 90,000 cps, a reduced pressure of the order of from 10 to 20 Torr should be maintained. The deaerating treatment capacity under such conditions is determined by the dimensions of the apparatus, which should be set to handle the capacity required for the subsequent step.

The fatty confectionary mass such as a chocolate and the like when subjected to deaerating according to the instant method is far superior in tempering efficiency (throughput rate) to the conventional fatty confectionary which is not deaerated. More specifically, a fatty confectionary mass when deaerated and tempered using the invention exhibits an improvement in tempering efficiency of 20 to 50% compared with a conventional (undeaerated) mass. This may be because the deaerated mass has an improved heat conductance. Further, a mass according to the instant method has a viscosity about 2,000 to 5,000 cps less than a conventional (not deaerated) tempered mass. As a result, the mass produced by the use of the invention is more easily filled into a mold and is more efficiently spread over the mold.

When the chocolate mass, substantially fully deaerated and tempered as described above is subjected to molding of chocolate blocks and the like with the use of the mold 18 as shown in FIG. 2, the mass is conveyed to the chocolate storage tank 13. The mass is filled into the mold 18. Shaking is then applied by the shaking unit 18' to the mold to spread and fill the mass in the mold 18. In this operation, the chocolate mass 14 should attain a level above the stirrer 15 mounted in the tank 13 to prevent air from being mixed into the accumulated mass layer 14 by the stirrer 15.

The shaking unit 18' need shake the mold only to the extent that the top of the mass, that is, the bottom of the chocolate product after demolding, is flat. For this reason, as compared with the prior art approach where vigorous shaking is required to debubble the chocolate, the instant method is capable of reducing the shaking time on the order of a factor of 1/5 to 1/10 or/and the shaking strength on the order of a factor of about $\frac{1}{2}$ to $\frac{1}{3}$. This affords advantages in that the noise derived from the shaking is reduced by the order of 10 to 12 phons, greatly improving the working conditions, increasing the chocolate molding speed, decreasing the shaking time, and simplifying the shaking unit to save space.

Subsequent to the aforementioned shaking, the chocolate filled into the mold 18 is accommodated in the cooling tunnel through which air at a temperature of the order of 5° to 12° C. is circulated to cool and solidify the product. A finished product containing substantially few bubbles is thus obtained upon releasing it from the mold.

According to the instant method, the fatty confectionary mass such as a chocolate or the like is forcibly and fully deaerated by the reduced pressure. The mass, which conventionally contains a quantity of bubbles on the order of 1.5 to 2.0% or more by volume, cannot be fully deaerated by shaking. For this reason, the instant method is extremely effective in deaerating such fatty confectionary mass with a viscosity of the order of from 25,000 to 30,000 cps as chocolate containing a relatively small proportion of fatty matter like cacao butter and its substitute, as chocolate containing relative large proportion of powdered skim milk, and as chocolate containing a cacao butter substitute (which tends to have a high viscosity at lower temperatures). Deaerating by the instant method enables the production of thin chocolate blocks with a thickness of 2 to 3 mm having a good appearance.

The extent of deaerating of the mass prepared according to the instant method may be determined by measuring the bubble content left in the mass. The lesser the bubble content left in the mixture, the more the fatty confectionary mass is deaerated and the higher the density thereof. More specifically, the bubble content of the mass may be determined by comparing the density thereof with the density of a chocolate confectionary standard sample which is fully deaerated and prepared so as to have substantially no bubble content.

Figure 3:
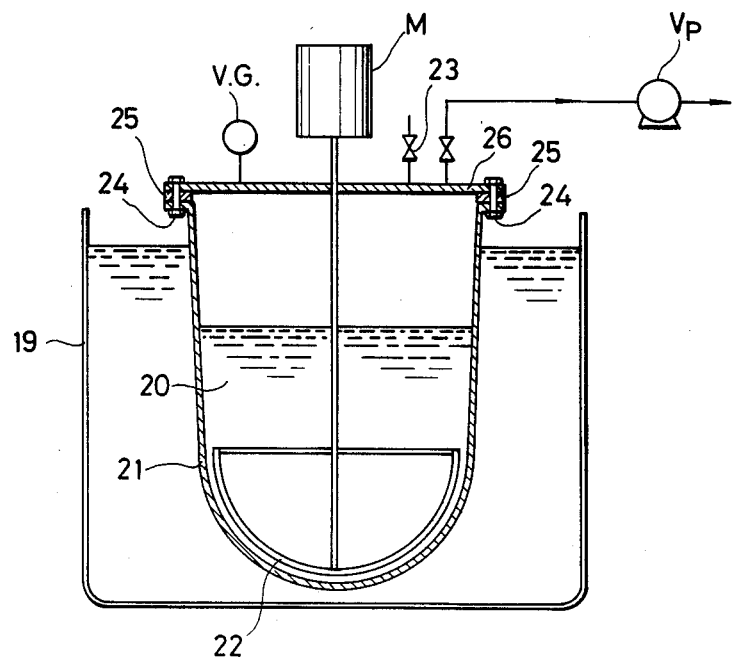
FIG. 3 is a longitudinal cross-sectional view of a deaerating device adapted to prepare standard deaerated chocolate samples.

This fully deaerated chocolate confectionary standard sample may be manufactured by an apparatus diagrammatically shown in FIG. 3. 300 gm of fluidal chocolate mass is placed in an air-tight container 21 with a capacity of 1 liter mounted in a water tank 19 for tempering (30° to 31° C.) shown in FIG. 13, and is then stirred at a circumferential speed of 40 m/min by an inner wall surface scraping blade 22 rotated by the motor M. The interior of the air-tight container 21 is maintained at a reduced pressure of 2 to 4 Torr. After attainment of a pressure of 2 to 4 Torr is verified by a vacuum gauge VG, the air-tight container is held at such a reduced pressure for 60 sec. The mass is then stirred for deaerating. Thereafter, the stirring of the mass is stopped, and a leak valve 23 is opened to bring the pressure in the air-tight container 21 to atmospheric pressure. A bolt 24 is then loosened and removed to remove a cover which carries a rubber packing 25 and the blade 22 to accommodate the deaerated chocolate mass together with the container body 21 in a cooling chamber for cooling and solidifying the mass. The solidified mass is released from the container body 21 and left as it is in the cooling chamber for one week to fully crystallize the cacao butter contained therein. The chocolate block as above prepared is then used as a fully deaerated standard sample.

To test the invention, chocolate samples deaerated by the inventive method and samples prepared by conventional method are cooled and hardened and left to stand at a temperature of from 19° to 20° C. for one week. Subsequently, measurements of their densities are compared with the density of the aforementioned fully deaerated standard sample. Measurements can be made at a room temperature of 19° to 20° C. by the use of a comparative gravimeter, Model 930 manufactured by Beckman Co. The densities of the chocolates at a temperature of 20° C. are calculated from the measured values.

Next, the air content, in terms of the volume of the chocolates, is calculated using the expressions:

$$\text{air content of chocolate sample} = \frac{\text{volume/gm of conventional chocolate sample} - \text{volume/gm of deaerated standard sample}}{\text{volume/gm of deaerated standard sample}} \times 100\%$$

$$= \frac{\text{density of deaerated standard sample (20° C.)}}{\text{density of conventional chocolate sample (20° C.)}} - 1 \times 100\%.$$

Currently available and marketed chocolate confectionaries have densities differing according to their composition and air content, but are normally within a range of from 1.221 to 1.270 gm/cc. The air content of the chocolate measured and calculated by the aforementioned test is of the order of 0.7 to 1.0% when it is of a viscosity of less than 20,000 cps, but is of the order of 1.5 to 2.0% when the chocolate is of a viscosity of more than 30,000 cps. Comparison of this chocolate with chocolates having a air content of from 0.2 to 20% shows that the lesser the air content, the better the bottom surface of the chocolate block, and the better the appearance of the top surface of the chocolate bar. Specifically, the chocolate has a better color and gloss to the extent that a difference is not noticeable to the naked eye if the air content is less than 0.7%.

The glosses of the respective chocolates are compared with one another by optical measurement, for instance, by use of a glossmeter, Model GM-26 made by Murakami Color Research Laboratory of Japan. From such measurements, it has been discovered, from observing reflections at an angle of 60° from a square surface of 5 mm×5 mm, that the gloss of the bottom surface of a chocolate block with a volumetric air content of 0.5% is about 3.5 times that of a similar chocolate block with an air content of 2.0%.

Hardness or solidity of the chocolate (the so-called "snap") correlates with masticability. As far as chocolate blocks are concerned, those broken with a snap are desirable. According to tests conducted by a specialist's panel of 30 members, chocolate blocks with a lesser air content are more acceptable. Among others, chocolate blocks with an air content of less than 0.7% are perceived as more tasty and sweet than if the air content is greater.

Figure 4:
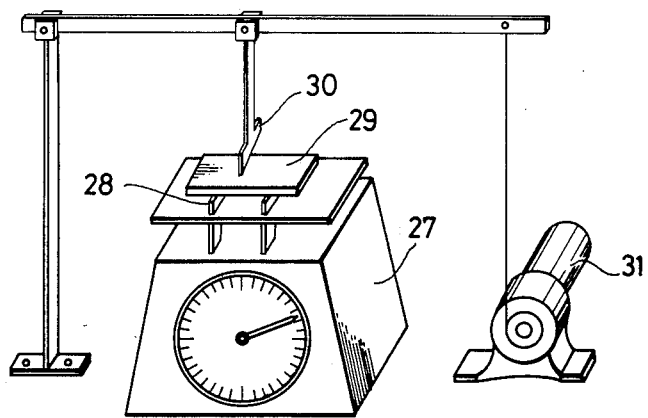
FIG. 4 is a perspective view of a sheet meter for measuring the hardness or solidity of chocolate products.

Hardness of the chocolate confectionaries are compared with each other using a sheet meter constructed as shown in FIG. 4 to prove that the chocolate products with an air content of less than 0.7% have an increased hardness of more than about 10% compared with a chocolate with an air content of 20%. For this comparison, a pair of steel plates 28, each of a thickness of 5 mm, were arranged at an interval of 26.5 mm on a spring balance 27, and a chocolate block 29 placed on the steel plates 28. A metal knife 30 having a thickness of 2 mm and inclined at an angle of 45° was pressed against the center of the chocolate at a speed of 1 cm per second upon rotation of a motor 31. The load generated when the chocolate block 29 is broken is read on the spring balance 27, and the result taken as the hardness of the chocolate block.

According to the instant method, the deaerated chocolate mass is tempered by a hermetically sealed continuous automatic tempering unit after deaerating and before being subjected to molding. It is noted that the automatic tempering unit is disposed downstream of the pipe 7 and the pump P of the apparatus as shown in FIG. 1. However, it is possible to first temper the chocolate mass using the conventional continuous automatic tempering unit and then deaerate it using the method of the instant method. In such an instance, the tempered chocolate mass fed from the continuous automatic tempering unit is supplied to the mass storage tank 5 of the apparatus shown in FIG. 1.

In the described embodiment of the present invention, when the mass is tempered after deaeration, the chocolate mass 4 is supplied at a measured rate from the storage tank 5 to the deaerating container 1 and then deaerated with the pressure in the deaerating container 1 set in accordance with the viscosity of the chocolate mass 4, preferably within the range of 10 to 350 Torr. The amount of cooling needed in the hermetically sealed continuous automatic tempering unit in the case it is located downstream of the deaerating container 1 may be reduced if cooling water is circulated through some or all of the jackets 9, 10 and 11 to pre-cool the chocolate mass. On the other hand, where the tempered chocolate mass is supplied from the storage tank 5 to the deaerating container 1, that is, in the case where the tempering unit is located upstream of the deaerating container 1, it is desirable to circulate water at a temperature of 30° to 31° C. in the jackets 9, 10 and 11 during the deaerating treatment. The temperature range of 30° to 31° C. is preferred to prevent the viscosity of the mass from increasing due to crystallization of cacao butter.

Figure 5:
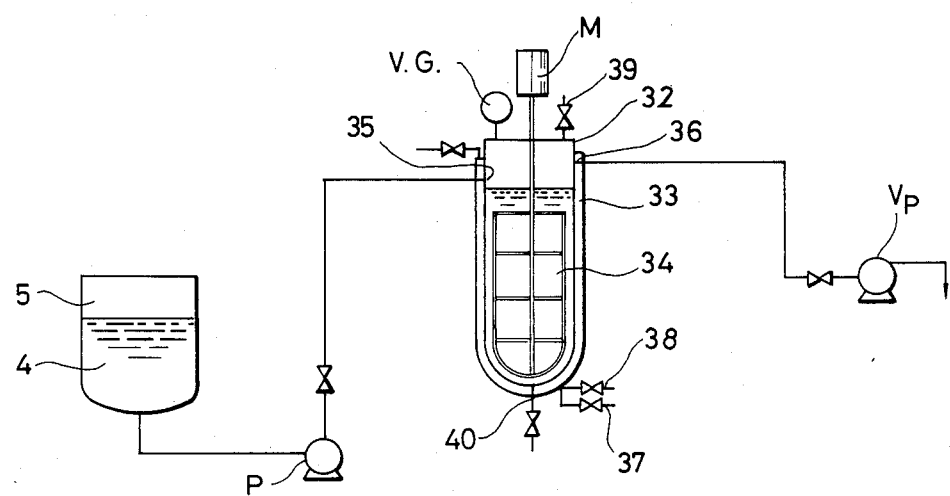
FIG. 5 is an illustrative view of another deaerating device which can be used in carrying out the method of the present invention.

If the chocolate is being manufactured on a small scale, the instant method may be carried out in a batch-type manner with the use of a vertical cylinder-type deaerating container 32 as diagrammatically shown in FIG. 5. This container 32 has an outer wall surrounded by a jacket 33, and is provided in its interior with an inner wall surface scraping agitator blade 34. To deaerate and temper the chocolate mass, a measured amount of the chocolate mass 4 is fed from an inlet 35 to the deaerating container 32. The fluid chocolate mass is then stirred by the scraping agitator blade 34 and deaerated with the interior of the container 32 maintained at a reduced pressure of from 10 to 350 Torr by the vacuum pump VP in communication with a discharge portion 36. At the same time, cold water is circulated through a cold water valve 37 through the jacket 33, whereby the temperature of the chocolate mass in the container 32 is reduced to the order of from 24° to 26° C. Immediately thereafter, the cold water valve 37 is closed and a warm water valve 38 is opened to circulate warm water through the jacket 33, thereby raising the temperature of the mass in the container 32 to from 28° to 30° C. for effecting tempering. Upon completion of tempering, a leak valve 39 is opened to open the interior of the deaerating container 32 to the atmosphere. The deaerated mass is then passed through an outlet pipe 40 and conveyed to the molding station. Where the mass is deaerated before tempering, the aforementioned method is also applicable, except that tempering of the chocolate is not effected by circulation of cold and warm water through the jacket 35. The chocolate mass thus deaerated is then subsequently tempered by a hermetically sealed continuous automatic tempering unit before being passed to the molding station.

Where tempered chocolate mass is deaerated by the use of the batch-type debubbling container 32 shown in FIG. 5, the mass is admitted into the container 32 and the temperature of the mass is maintained in a range of 30° to 31° C. by circulating water through the jacket 33 while the mass is being stirred with the scraping blade 34. Stirring is then stopped, after which the leak valve 39 is opened to release the vacuum of the interior of container 32. The chocolate mass is then conveyed to the molding station.

Compared with the aforementioned continuous method, this batch-type deaerating method renders the apparatus simple and compact and is suitable for small-scale or test production, but is not generally well suited for mass production since the fatty confectionary mass is again mixed with air by the stirring produced by scraping the inner wall surface when the mass is being expelled from the container. Hence, difficulty is involved in fully discharging the deaerated mass. Also, difficulty is involved in the timing of the changeover of cold water to warm water for tempering, and considerable skill is required for this task. The air content of chocolate deaerated and tempered by the batch-type deaerating method of the invention may be of the order of less than 0.7%, similar to the case where deaerating and tempering are carried out simultaneously with the continuous-type method firstly described. The batch-type method also yields chocolates excellent in color, gloss and taste.

The deaerated chocolate mass according to the instant method is suitable not only for molding of chocolate blocks by filling into molds, but also for manufacturing chocolate-covered products such as chocolate-covered candies or cookies and the like by covering a confectionary center with chocolate mass. Compared with covering chocolate with an air content of 0.7 to 12% produced according to the conventional method, the instant method reduces the air content to the order of 0.2 to 0.4% and lowers its viscosity by 10% or more to thus remarkably improve the covering ability of the chocolate. The instant method is very useful for covering chocolate since it provides an an excellent color when cooled and solidified and excellent gloss as well as masticability and taste.

Several examples will now be discussed. For these examples, the viscosity of the covering chocolate mass was measured at 4 rpm by the use of No. 6 rotor of a B-type viscometer manufactured by Tokyo Keiki Co., Ltd., of Japan.

EXAMPLE 1

Constituents of 20.0 parts cacao mass, 42.0 parts sugar, 17.5 parts cacao butter, and 0.5 lecithin were ground by the use of a roller mill to the extent that the mass could pass through a 230 mesh (ASTN) (240 mesh (British Standard)) sieve and were conched to thus prepare a milk chocolate mass. About 1 kg of the milk chocolate mass was placed in an open tempering unit with a capacity of 1 liter and then cooled to 25.5° C. and subsequently heated to 28.5° C. At that point, the milk chocolate mass had a viscosity of 50,000 cps and a water content of 0.82%. About 500 gm of the milk chocolate was fed to a batch-type deaerating container 32 having a capacity of 1 liter and having therein an inner wall surface scraping blade 34. Warm water was circulated through the jacket of the container 32, and the scraping blade 34 was rotated at a circumferential speed of 40 m/min for stirring. Simultaneously, the pressure in the deaerating container was reduced to 20 Torr by a vacuum pump and held for 60 sec to effect deaerating.

Then, the leak valve 39 was opened after halting stirring to raise the pressure in the deaerating container back to atmospheric pressure. The valve mounted downstream of deaerating container was opened to extract the deaerated milk chocolate mass. At that time, the viscosity of the milk chocolate mass was 46,000 cps and the water content was 0.82%.

A comparison test was conducted in such a manner that the milk chocolate mass tempered by the open tempering unit was placed in the deaerating container 32 and warm water at 29.5° to 30.5° C. was circulated through the jacket of the container 32. The viscosity of the milk chocolate mass stirred for 60 sec in the same manner as aforementioned was 49,000 cps; that is, the viscosity increased by 3,000 cps compared with the milk chocolate mass deaerated as above. The water content of the mass was unchanged at 0.82%.

Six grams of the deaerated milk chocolate mass was filled into each of a plurality of molds formed of polycarbonate resin, measuring 21 mm in width, 30 mm in length and 9 mm in depth and arranged on a flat plate. Each of the molds was subjected to shaking at 930 rpm with a stroke length (amplitude) of 2.5 mm, and accelerated at 2.3 G to spread the mass over the mold, thereby to level the top of the mass. The amount of noise generated from the shaking operation was 99 phons measured at a position 20 cm therefrom. The noise level was measured by a Nord PS 101 sound level meter manufactured by Nord Co.

For comparison, undeaerated milk chocolate mass prepared in the same manner as aforementioned was filled, again in amount of 6 gm, into molds and subjected to shaking. The shaking required for debubbling the mass and holding to the same degree as with the use of the invention took 125 seconds. The comparative sample was shaken at 930 rpm with an amplitude of 3.1 mm and accelerated at 7.4 G with the deaerated mass requiring 6 sec and the undeaerated mass on the order of 35 sec.

In this case, the measured amount of noise was 113 phons at a position 20 cm from the shaking unit. The chocolate thus filled in molds was moved to a cooling tunnel through which flowed air at a temperature of 5° to 10° C. where it was cooled for 20 min., thereby releasing it from the mold. Consequently, chocolate products having a height of 6 mm were obtained which measured 245 mm in width and 40 mm in length at their bottoms and 21 mm in width and 36 mm in length at their tops.

For chocolate blocks made by the instant method, the air content was 0.21%, whereas the air content of milk chocolate molded from undeaerated mass was 2.07%, proving the significant effect of the deaerating treatment of the invention.

From visual observation, it was found that the bottom surface of milk chocolate blocks molded from the deaerated chocolate mass were more smooth, flat and glossy than the comparative chocolate blocks, having a dark chocolate brown color, as is considered normal with chocolate in general. The gloss was measured optically. The milk chocolate blocks produced in accordance with the present invention had a gloss of 5.79, and the comparative chocolate blocks 1.66.

Further, taste tests were conducted by a panel of 30 specialists using a two-point comparative method. Superior masticability and taste of the milk chocolate blocks produced in accordance with the present invention were appraised by 29 specialists, while one specialist suggested that the two types chocolate blocks were of the same quality level. The hardnesses of the two types of chocolate blocks were compared using the above method carried out at a temperature of 20° C.; ten pieces of chocolate molded in accordance with the present invention averaged 2.725 kg/piece and the same number of comparative chocolate blocks averaged 2.4199 kg/piece (12% weaker than the former). The chocolate blocks with the smaller strength also exhibited an inferior "snap".

EXAMPLE 2

20.5 parts cacao mass, 35.6 parts sugar, 2.0 parts milk sugar, 3.0 parts skim milk, 26.4 parts cocoa butter, 10.0 parts vegetable fat and 0.5 parts of lecithin were blended together and ground to a particle size sufficient to pass through a 230 mesh (ASTN) sieve and conched. Covering chocolate mass having a viscosity of 10,000 cps at 42° C. was obtained. The mass was supplied at a rate of 200 kg/h by a double mechanical seal type gear pump to a vertical cylinder type deaerating container 1, such as that shown in FIG. 1, having dimensions of 250 mm in inner diameter and 1,000 mm in inner height, and having an inner wall surface scraping rotary blade and three jackets 9, 10 and 11, each 240 mm in inner height. The mass was subjected to a deaerating treatment by operating the rotary blade at a peripheral velocity of 117 m/min while maintaining the internal pressure of the deaerating container at a reduced value of 310 Torr.

Water at a temperature of 10° C. was circulated through two upper jackets, that is, the first and second jackets 9 and 10. As seen in FIG. 1, the temperature of the covering chocolate mass passing along the inner wall of the deaerating container was lowered to 28° C. and 25° C., respectively, at the first and second jackets, while warm water was circulated through the third jacket 11 to raise the temperature of the mass to temper it. The deaerated chocolate mass thus produced had a viscosity of 12,500 cps. About from 11 to 12 sec was needed for the chocolate mass to pass through the deaerating container. The mass thus deaerated was transferred to a covering apparatus (enrober) by means of a double mechanical seal type gear pump coupled to the outlet of the deaerating container. The mass was there used to coat a confectionary center to produce a covered chocolate product.

On the other hand, for comparative purposes, the vacuum pump was not operated, that is, the pressure was not reduced, and the mass was merely subjected to the tempering in the deaerating container at atmospheric pressure. To reduce the temperature of the chocolate mass in the second jacket by circulating cold water at a temperature of 10° C., it was necessary to reduce the flow rate of the chocolate mass to 125 kg/h. The temperature of the chocolate mass was raised to 28° C. by passing warm water through the jacket 11, and the mass was transferred by means of a transfer pump coupled to the outlet 3 of the deaerating container via a transfer pipe to the coating apparatus wherein the mass was used to cover a confectionary center.

In this case, the comparative specimen had a viscosity of 14,500 cps. The air content of the covering chocolate was 0.90% for the comparative specimen versus 0.19% for that of the present invention. Moreover, the specimen of the present invention was found superior in gloss and taste, and the color and general overall appearance were quite excellent.

EXAMPLE 3

18.5 parts cacao mass, 43.7 parts sugar, 20.0 parts total skim milk, 17.5 parts cocoa butter, 0.5 parts lecithin and 0.05 parts flavoring were blended and ground by means of a roller mill to yield a particle size sufficient to pass through a 230 mesh (ASTN) sieve and were conched to thereby form a milk chocolate mass. The mass was subjected to tempering treatment by means of a TA-type continuous automatic tempering machine manufactured by Karl Montary Co., of Italy. The viscosity of the mass thus treated was 70,000 cps at 29.5° C. The mass was then fed continuously at a rate of 500 kg/h to the same deaerating container as that used in Example 2 by means of the double mechanical seal type gear pump. In the deaerating container, the mass was deaerated by rotating the rotary blade at a peripheral velocity of 125 m/min while the internal pressure of the deaerating container was maintained at 20 Torr. Warm water at a temperature of about 30° to 31° C. was circulated to maintain the temperature of the mass constant during the deaerating operation. About 9 to 10 sec was required for the mass to pass through the deaerating container. The mass was transferred by the double mechanical seal type gear pump to the storage tank of the molding unit via the transfer pipe. 40 gm of the mass was then filled into a polycarbonate mold 18 and subsequently shaken for 15 seconds with a stroke length of 2.5 mm, speed of 15.5 rpm and acceleration of 2.3 G, thereby causing the mass to completely fill the mold and attain a level mass surface.

For comparative purposes, 40 gm of the chocolate mass was filled into a mold immediately after the tempering operation, and subjected to shaking for 90 sec with a stroke length of 3.1 mm, speed of 15.5 rpm and acceleration of 7.4 G. Then, the mass was allowed to solidify by cooling in the same manner as that in Example 1 to thereby obtain chocolate products in sheet form with a weight of 40 gm/sheet.

The air content of the chocolate thus made was calculated on the basis of the measured viscosity. That of the comparative specimen was 2.13% and that of present invention was 0.58%. The bottom surface of the comparative specimen was rough, having many bubble venting traces and convex raised portions, while its color tone was considerably whitish and inferior in gloss to the specimen of the present invention. The color of the latter specimen was a dark chocolate brown color, and the gloss was superior. Furthermore, in taste tests performed by a panel of 30 specialists, all specialists appraised that the specimen of the present invention was superior to the comparative specimen in masticability and taste.

EXAMPLE 4

38.4 parts sugar, 6 parts milk sugar, 21 parts total skim milk, 21 parts cocoa butter, 13 parts vegetable fat, 0.5 parts lecithin and 0.1 parts of flavoring were blended together and grounded by means of a roller mill to yield a particle size sufficient to pass through a 230 mesh (ASTN) sieve and conched. The resultant white chocolate mass was tempered in a continuous automatic tempering machine manufactured by Aasted Co of Denmark. The viscosity of the tempered white chocolate mass was 32,500 cps at 29.5° C., while its moisture content was 0.70% as measured using a pressure reducing method.

Then, the mass was continuously fed at a rate of 800 kg/h to the deaerating container 1 (the same as used in Example 2), through the jacket of which warm water at 29.5° C. was circulated. The internal pressure of the mass conveying pipe was held in the range of 0.5 to 0.8 kg/cm$^2$ by adjusting the inlet pipe valve of the deaerating container. The deaerating treatment was carried out while maintaining the internal pressure of the deaerating container at 30 Torr by means of a vacuum pump while stirring the mass at a peripheral velocity of 150 m/min. About 7 to 8 sec was needed for the chocolate mass to pass through the deaerating container. A double mechanical seeled type gear pump was utilized to convey the mass to the molding machine through a conveying pipe. The viscosity of the mixture was 30,000 cps at 29.5° C., 2,500 cps lower than the undeaerated mass. This indicates that no variation in the evaporative components such as water and the like took place as a result of the deaerating treatment conducted for a brief period in accordance with the present invention.

Six grams of the chocolate mass was filled into a polycarbonate mold and then was shaken for 15 sec with a stroke length of 2.5 mm, speed of 15.5 rpm and acceleration of 2.3 G, thereby causing the mass to completely fill the mold and simultaneously making the chocolate mass surface level.

For comparative purposes, 6 gm of the not deaerated chocolate mass was likewise filled into a mold immediately after tempering and then shaken. In this case, the shaking was carried out more intensely than was done in the method of the present invention. Specifically, the stroke length was 3.1 mm, the speed was 15.5 rpm and the acceleration was 7.4 G. Moreover, the shaking operation was carried out for a longer period of 75 sec. Subsequently, the mass was allowed to solidify by cooling to thereby obtain white chocolate in sheet form with a weight of 6 gm/sheet.

The air content of the white chocolate, as determined from the viscosity thereof, was 0.41% in the product formed in accordance with the present invention and 2.20% in the comparative chocolate. The strength of the chocolate was measured using the above-described method carried out at a temperature of 20° C. to compare the two specimens for "snap". The result was that the product formed in accordance with the present invention averaged 2.787 gm/sheet and the comparative product averaged 2.618 gm/sheet, indicating the effect of improving the "snap" by the deaerating treatment of the invention. The back side of the comparative white chocolate specimens was rough having many bubble venting traces and convex-like raised portions produced by bubbles, and their gloss was considerably inferior to that of the specimens formed in accordance with the present invention.

Moreover, in a taste test conducted with a panel of 30 specialists, 27 specialists appraised that the chocolate formed in accordance with the present invention was superior to the comparative chocolate in masticability and taste, while three specialists appraised that these two types of chocolates were of the same quality level.

We claim:

1. A method for manufacturing a deaerated fatty confectionary consisting essentially of the steps of: holding a fatty confectionary mass in a fluidal state at a reduced pressure lower than atmospheric pressure and stirring with a scraping rotary blade to subject said mass to a deaerating treatment of removing air from said mass, and manufacturing confectionary products with the deaerated mass wherein said fatty confectionary mass has a viscosity of less than about 90,000 cps, and said reduced pressure is in a range of 10 to 350 torr, and said reduced pressure is inversely proportional to said viscosity, and wherein said fatty confectionary mass is subjected to said deaerating treatment until a quantity of air therein is less than 0.7% by volume, and said fatty confectionary mass is in a form of a thin film during said deaerating treatment and at said reduced pressure.

2. The method as claimed in claim 1, wherein said fatty confectionary mass is one of a chocolate, a covering chocolate, a white chocolate, and a colored chocolate.

3. The method as claimed in any one of claims 1 or 2, wherein said fatty confectionary mass is held at said reduced pressure in a vertical deaerating container having an inner wall surface divided into zones of different temperatures, said container being provided at its top with an inlet for said fatty confectionary mass and at its bottom with an outlet for the deaerated mass, and further comprising the step of stirring said mass around said inner wall surface of said container during said deaerating treatment with said scraping rotary blade disposed in said container.

4. The method as claimed in claim 3, wherein said deaerating container is provided on its outer wall surface with a plurality of jackets for providing said zones of different temperatures.

5. The method as described in claim 4, further comprising the step of passing water through said jackets at a temperature selected to prevent a tempered condition of said mass from being deteriorated by heat conduction from said jackets.

6. The method as claimed in claim 3, further comprising the step of subjecting said mass to a tempering simultaneously with said deaerating treatment by regulating temperatures of said zones.

7. The method as claimed in claim 6, further comprising the step of supplying the deaerated mass from said container to a continuous hermetically sealed automatic tempering machine to subject said mass to a further tempering.

8. The method as claimed in claim 7, further comprising the step of cooling said mass prior to said mass reaching said automatic tempering machine.

9. The method as claimed in any one of claims 1 or 2, further comprising the step of tempering said fatty confectionary mass prior to said deaerating treatment.

10. The method as claimed in any one of claims 1 or 2, further comprising the step of tempering said fatty confectionary mass during said deaerating treatment.

11. The method as claimed in any one of claims 1 or 2, further comprising the step of tempering said fatty confectionary mass after said deaerating treatment.

12. The method as claimed in claim 1, further comprising the step of filling the deaerated mass into a mold.

13. The method as claimed in claim 1, further comprising the step of covering the deaerated mass over a confectionary center.

* * * * *